(12) United States Patent
Vandersmissen (10) Patent No.: US 11,842,275 B2
(45) Date of Patent: Dec. 12, 2023

(54) IMPROVING SEGMENTATIONS OF A DEEP NEURAL NETWORK

(71) Applicant: AGFA NV, Mortsel (BE)

(72) Inventor: Eva Vandersmissen, Mortsel (BE)

(73) Assignee: Agfa NV, Mortsel (BE)

( * ) Notice: Subject to any disclaimer, the term of this patent is extended or adjusted under 35 U.S.C. 154(b) by 267 days.

(21) Appl. No.: 17/298,718

(22) PCT Filed: Dec. 2, 2019

(86) PCT No.: PCT/EP2019/083245
§ 371 (c)(1),
(2) Date: Jun. 1, 2021

(87) PCT Pub. No.: WO2020/114941
PCT Pub. Date: Jun. 11, 2020

(65) Prior Publication Data
US 2022/0051045 A1    Feb. 17, 2022

(30) Foreign Application Priority Data

Dec. 5, 2018 (EP) .................................. 18210459

(51) Int. Cl.
*G06T 7/00* (2017.01)
*G06N 3/08* (2023.01)
(Continued)

(52) U.S. Cl.
CPC ................. *G06N 3/08* (2013.01); *G06T 7/12* (2017.01); *G06T 7/143* (2017.01); *G06V 10/25* (2022.01);
(Continued)

(58) Field of Classification Search
CPC . G06N 3/08; G06N 3/045; G06T 7/12; G06T 7/143; G06T 2207/10116;
(Continued)

(56) References Cited

U.S. PATENT DOCUMENTS 6,212,291 B1 *  4/2001  Wang ..................... G06T 7/0012
                                                            382/173
6,353,674 B1 *  3/2002  Dewaele .................. G06T 7/11
                                                            382/168
(Continued)

FOREIGN PATENT DOCUMENTS

EP         1 256 907 A1     11/2002

OTHER PUBLICATIONS

International Search Report dated Mar. 10, 2020 relating to PCT/EP2019/083245, 5 pages.
(Continued)

*Primary Examiner* — Van D Huynh
(74) *Attorney, Agent, or Firm* — Leydig, Voit & Mayer, Ltd.

(57) ABSTRACT

This invention is related to a method to improve the performance of a deep neural network (10) for the identification of a segmentation target (111) in a medical image (12, 110), comprising the steps of performing n training steps on said deep neural network (10) for the identification of said region of interest on two different representations (13, 14) of the same segmentation target (111), said representations (13,14) being definitions of the same segmentation target (111).

20 Claims, 3 Drawing Sheets

(51) Int. Cl.
*G06T 7/12* (2017.01)
*G06T 7/143* (2017.01)
*G06V 10/94* (2022.01)
*G06V 10/25* (2022.01)
*G06V 10/75* (2022.01)
*G06V 10/764* (2022.01)
*G06V 10/776* (2022.01)
*G06V 10/80* (2022.01)
*G06V 10/82* (2022.01)
*G06V 10/48* (2022.01)
*G06V 10/26* (2022.01)
*G06V 10/46* (2022.01)

(52) U.S. Cl.
CPC .............. *G06V 10/26* (2022.01); *G06V 10/46* (2022.01); *G06V 10/48* (2022.01); *G06V 10/757* (2022.01); *G06V 10/764* (2022.01); *G06V 10/776* (2022.01); *G06V 10/809* (2022.01); *G06V 10/82* (2022.01); *G06V 10/95* (2022.01); *G06T 2207/10116* (2013.01); *G06T 2207/20081* (2013.01); *G06T 2207/20084* (2013.01); *G06V 2201/033* (2022.01)

(58) Field of Classification Search
CPC . G06T 2207/20081; G06T 2207/20084; G06T 7/11; G06V 10/25; G06V 10/26; G06V 10/46; G06V 10/48; G06V 10/757; G06V 10/764; G06V 10/776; G06V 10/809; G06V 10/82; G06V 10/95; G06V 2201/033; G06V 2201/03; G06F 18/254

USPC ........................................................ 382/131
See application file for complete search history.

(56) References Cited

U.S. PATENT DOCUMENTS

| | | | | |
|---|---|---|---|---|
| 6,775,399 | B1* | 8/2004 | Jiang | G06T 5/005 |
| | | | | 382/128 |
| 2007/0019853 | A1* | 1/2007 | Luo | G06V 10/28 |
| | | | | 382/201 |
| 2008/0031505 | A1* | 2/2008 | Barski | G16H 30/20 |
| | | | | 382/132 |
| 2009/0238433 | A1* | 9/2009 | Rao | G06T 7/13 |
| | | | | 382/132 |
| 2013/0308851 | A1* | 11/2013 | Bertens | G06T 7/11 |
| | | | | 382/132 |
| 2017/0287137 | A1* | 10/2017 | Lin | G06V 10/454 |
| 2018/0315188 | A1* | 11/2018 | Tegzes | G06T 7/11 |
| 2020/0057907 | A1* | 2/2020 | Kobayashi | G06T 7/60 |

OTHER PUBLICATIONS

Written Opinion dated Mar. 10, 2020 relating to PCT/EP2019/083245, 9 pages.
Chen, Liang-Chieh et al., Semantic Image Segmentation with Task-Specific Edge Detection Using CNNs and a Discriminatively Trained Domain Transform, IEEE Conference on Computer Vision and Pattern Recognition (CVPR), IEEE, Jun. 2, 2016, 14 pages.

\* cited by examiner

IMPROVING SEGMENTATIONS OF A DEEP NEURAL NETWORK

REFERENCE TO RELATED APPLICATIONS

This application is a 371 National Stage Application of PCT/EP2019/083245, filed Dec. 2, 2019, which claims the benefit of European Application No. 18210459.6, filed Dec. 5, 2018, the contents of which are incorporated by reference herein in their entirety.

TECHNICAL FIELD

The present invention relates generally to a method to improve the segmentation performance of a computer implemented deep learning algorithm, and this especially in the field of X-ray imaging. It is the purpose of this invention to generally improve the performance of particular segmentation tasks in radiography images, such as the detection of the collimation area, or the area in the image which is obscured by a body part, or the area representing bony structures.

BACKGROUND OF THE INVENTION

The performance of a medical imaging segmentation task, such as the determination of the collimation area in a radiography image is a typical problem in general radiography that up-to today finds many computer implemented approaches, which rely on different image processing methods. The collimation area is the exposed area of a detector forming the image that is produced by a collimated X-ray beam. Specifically for the collimation area detection problem, different conventional image processing solutions have been proposed in the art that rely at least on some form of edge detection. Collimation area detection was traditionally applied in practice by the radiographer on a freshly acquired image before it was sent to the radiologists reading station. The collimation step as such allowed the radiographer to remove superfluous areas of the acquired image without relevant information, while at the same time providing focus for the radiologist on the region of interest. Automation of this otherwise manual operation using image processing techniques reduces the workload for the radiographer.

Conventional image processing and feature detection techniques rely on known features of the elements within the image to be detected, such as for instance a sharp edge at the border of the collimation area, or knowledge about the image information at the edges of an image. Also for instance, is it characteristic by nature for a collimated radiograph that the collimation area has a known rectangular shape, at least when the collimation area entirely fits the visible image.

Nevertheless, said conventional methods or task-specific algorithms often fail to correctly determine these collimation edges because of different reasons, such as for instance the high variability in the grayscale values on such an edge, which may be easily detectable by the human eye, but which may confuse conventional image processing algorithms when not properly implemented.

This results in the frequent occurrence of two types of error: either the collimation area is estimated as being too large (false negative errors), or else too much of the usable image is hidden by assumed collimation borders (false positive errors). The false positive errors are far less desirable, because in this case an undesired, but available, portion of the image is discarded (or cut away) which may lead to a retake of the image in the worst case scenario.

Relatively recently, computer based artificial intelligence is being considered as a potential solution for various image categorisation and segmentation problems. More specifically, artificial neural networks are trained (to progressively improve their ability) to do tasks by considering examples, generally without task-specific programming. For example, in image recognition, they might learn to identify images that contain cats by analysing example images that have been manually labelled as "cat" or "no cat" and using the analytic results to identify cats in other images. They have found most use in applications difficult to express with a traditional computer algorithm using rule-based programming.

Segmentation tasks in medical images fall in this category, and a lot of investigation is being done in this area on deep learning and in the application of deep neural networks. Deep learning computing are computing systems vaguely inspired by the biological neural networks that constitute animal brains. The neural network itself is not an algorithm, but rather a framework for many different machine learning algorithms to work together and process complex data inputs. Such systems "learn" to perform tasks by considering examples, generally without being programmed with any task-specific rules.

A deep neural network is an artificial neural network with multiple layers which consists of interconnected nodes between the input and output layers. According to the input patterns, the deep neural network is presented with and using a learning rule, it can be trained to find a mathematical manipulation by modifying the weights of the connections between the layers to turn the input into the output. The network moves through the layers calculating a confidence level of each output. As such, a deep learning network may be trained to recognize the collimation area in a radiography image, and return the recognition result as a confidence level map. The user can review the results and compare them with the output the network should display (i.e. compare them with a confidence level map representing the ground truth, being the correct answer). Each mathematical manipulation as such is considered a node in a layer, and complex deep neural networks have many layers, hence the name "deep" networks. The goal is that eventually, the network will be trained to decompose an image into features, identify trends that exist across all samples and process new images by their similarities without requiring human input.

This principle may thus be applied to many different problem statements and is thus not limited to the application of finding the collimation area.

SUMMARY OF INVENTION

The present invention provides a method for improving the performance of a deep neural network for the identification of a segmentation target (or a region of interest) in a medical image, comprising the steps of performing two training steps on said deep neural network for the identification of said region of interest on two different representations of the same segmentation target, said representations being a definition of a region and of a contour of said segmentation target, such as a detected confidence level region map and a detected confidence level contour map, as set out in claim 2.

More generally, the present invention provides for a method for improving the performance of a deep neural network on performing a segmentation task of identifying a region of interest in an input image which is a medical image, comprising the steps of, performing n training tasks on said deep neural network for the identification of said region of interest, wherein each training task is respectively performed on a different representation of said segmentation target, wherein n≥2, performing a validation of one of said n representations of said segmentation target against the remaining of n representations, by means of applying shape similarity or shape matching algorithms between said one of said n representations and said remaining of n representations, returning a validated segmentation result comprising a validated representation of said segmentation target as a result for the identified region of interest.

Specific examples and preferred embodiments are set out in the dependent claims.

In the context of this invention, a detected confidence level region map represents the pixel wise probability of the presence of a part of the segmentation target in the medical image in the form of an image matrix. The probability of the presence of a pixel element at a pixel location is expressed as the pixel value. Similarly, a detected confidence level contour map represents the pixelwise probability of the presence of a part of a contour in the same medical image in the form of an image matrix.

The result achieved by the dual learning step as described above is that the deep neural network is trained twice on the same input data, resulting in a double output representing however the same result: the segmentation target represented by an area in the image (a detected confidence level region map), and the same segmentation target represented as a contour delineating the same area (a detected confidence level contour map). In the training step, the deep neural network is presented with two sets of ground truths for the two desired outputs. Since the internal working of the neural network is different for the detection of the different representations of the segmentation result, it intrinsically means that there is truly supplementary information created that may be used to enhance the detection outcome.

Generally speaking, a deep neural network can thus be trained on different representations of the same segmentation result. In the context of this invention, a representation of a segmentation target may be a contour, a contour map, a probability contour map, a region map, a probability region map, a set of contour points, a set of corners delineating a polygon, a set of piecewise continuous functions or alike, that each may be embodied as an image mask representing said representations in the same or different spatial resolution as the original medical image or—alternatively—that can be described in another way (such as a list with coordinates of corners, or an alternative parameter space than the image space such as for example the polar representation of a line).

In the subsequent steps of the method of this invention, the detected confidence level contour map is used to identify a number of contour elements, which are tested and validated against the information that is present in the second output; the detected confidence level region map.

In the context of this invention, a contour map has to be understood as a representation of a contour in the form of a matrix (image matrix), a grid, a map or a mask. In this representation, the pixel value in a certain map location will determine the presence of a part of the contour at the location of that pixel. In case of a confidence level contour map, the pixel value in a certain map location will determine the probability of the presence of a part of the contour at the location of that pixel. Some locations in this confidence level contour map will have a higher probabilities associated to them than others.

In the context of this invention, the "detected confidence level contour map" is the contour map (in the form as explained above) that is calculated by the deep neural network from the provided input of a medical image.

The above mentioned principles may be applied to a segmentation algorithm that is for instance targeted toward the segmentation of the collimation area in a radiographic image. The improved collimation segmentation algorithm of the invention will reduce the number of false positive and false negative errors, and thus will eventually reduce the risk for wrongly interpreting a part of the image when part of the region of interest is—for instance—mistakenly hidden. A false positive error in this context is the erroneous underestimation of the collimation area in a radiographic image. Another advantage is that consequently less manual intervention by a radiographer will be needed for making corrections to the collimation polygon. Also will the better detection performance of the exact collimation area lead to an improved image perception of the image when the collimation borders are more precisely black-bordered (i.e. visually collimated). Further advantages and embodiments of the present invention will become apparent from the following description and drawings.

The present invention can be implemented as a computer program product adapted to carry out the steps as set out in the description. The computer executable program code adapted to carry out the steps set out in the description can be stored on a computer readable medium.

BRIEF DESCRIPTION OF DRAWINGS

FIG. 1 is a graphic representation of the training process of a deep neural network [10]. The diagram represents the untrained deep neural network [10] which is fed with a set of medical images [12] as input for which a segmentation target (or ground truth) represented as a contour [13] and represented as a region [14] is available. A comparison [15] of the outputs [16] and [17] of the deep neural network (represented respectively by a contour and a region) is done with the respective ground truths [13] and [14]. A loss function is calculated indicating the relevance of the produced outputs [16] and [17], based on which an adjustment of the parameters [20] of the nodes in the deep neural network is performed. A new iteration step will then evaluate the performance of the adjusted deep learning network by means of the recalculation of the loss function.

This discrete contour element [301] is applied [304] to the safe initial contour [200] replacing one of the (former) contour elements, and as such changing into an improved proposal contour [210]. In a next step, a validation [305] of the changed contour element is performed by comparing the outputs of a cost function applied to both the safe initial contour [200] and the improved proposal contour [210]. The output of the cost function decreases in case there is a better measure of agreement d with the detected confidence level region map and/or the detected confidence level contour map. In case that the cost function of the improved proposal contour [210] is lower than the compared original contour [200], the contour element is validated and then proposal contour is propagated to the next iteration [305].

FIG. 4 is a flowchart depicting subsequent iterations of a preferred embodiment of the method of the invention. The flowchart represents the method that starts after the successful validation of a first contour element [301]. The data in the confidence level contour map [120] that contributed to the identification of the discrete contour element [301] is subsequently subtracted from the original confidence level contour map [120], resulting in another (more limited) confidence level contour map [121]. This limited confidence level contour map [121] is then subsequently again further decomposed [300], resulting in a new discrete contour element [301']. This discrete contour element [301'] is then applied [304] to the previously improved proposal contour [210], resulting in a further improved proposal contour [210']. Again, a validation [305] is performed, propagating a positive result to the next iteration step for which again a (more limited) confidence level contour map [122] is constructed. At the end of the iterative process, a final contour result [910] is available.

DESCRIPTION OF EMBODIMENTS

In the following detailed description, reference is made in sufficient detail to the above referenced drawings, allowing those skilled in the art to practice the embodiments explained below.

Figure 1:
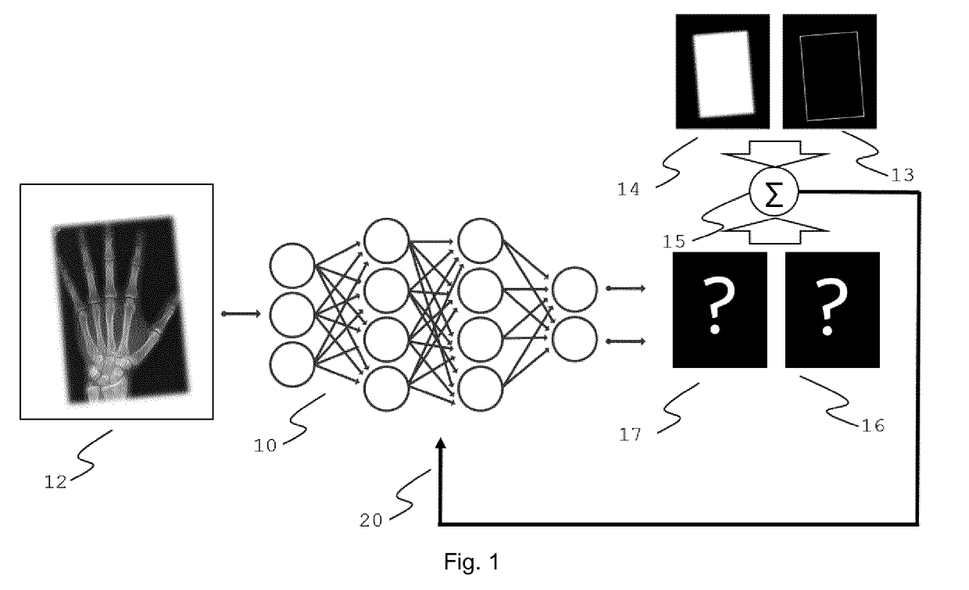

As an initial step, in a preferred embodiment, one single deep neural network [10] is trained simultaneously on identifying two different representations [13, 14] of the same segmentation target [111], said representations being a definition of a region and of a contour of said segmentation target. In order to do so, a deep neural network defined by a number of nodes and a number of layers, is presented with a so-called training set of data [11]. This training set comprises a preferably high number of medical images [12] in which the segmentation target is visible, and for which the desired outputs [13, 14] are available. This means that for each of the training images, a description of the respective segmentation solutions have to be available. The segmentation solutions may be presented to the deep neural network in various formats, but both solutions need to be available; the segmentation target marked as a contour [13] and marked as a region [14]. The training set of medical images will, in practice, be prepared for training the deep neural network by means of a consistent set of digital images (characterized by a certain spatial resolution), and for instance a set of digital image masks representing the segmentation target as an area and as a contour. The digital mask representations may be provided in the same or other spatial resolution than the medical image itself. The set of digital image masks may be discrete maps (comprising only 1 or 0 as a presence indicator in the respective pixel location), or by confidence level maps (providing a pixel-wise probability for the presence of a region of interest).

In another preferred embodiment, the single deep neural network may be replaced with two deep neural networks which will be trained separately on the different result types. One network will be trained to identify the segmentation target marked as a contour, while the other will be trained to identify the segmentation target marked as a region. This embodiment has the advantage that the overall performance of the pair of networks is higher in comparison with the performance of a single network, thanks to the specialisation of a network towards the performance of a single task. While this approach is expected to produce even better results (show better segmentation performance), this will come at the cost of more computing power.

In a preferred embodiment, the deep neural network is trained on the identification of the collimation area in a radiography image. The collimation area of a radiographic image is in fact the exposed portion of the image which is limited by the X-ray sources' collimators to reduce the exposed area of the patient to a minimum sufficient to perform the intended diagnose or reading. The collimation area typically has a rectangular shape, and contains the diagnostic data of the radiographic image. The unexposed area outside of this collimation area in this radiography image typically has a white color with little relevant information, as it is (usually completely) underexposed. Since collimation blades do not always block all the radiation, this white area partially still comprises image information. The result is that alongside the collimation area, there is a faint imprint of the surroundings of the collimated area, allowing sometimes a better orientation for the reader.

In general, there are multiple reasons why it is advantageous to identify the collimation area in a radiography: 1) it allows to focus image processing algorithms solely on the collimation area of this image (which most of the time improves the performance of such algorithms), 2) it makes it possible to selectively invert the color of the collimated area (i.e. the area outside the collimation) so that it is more comfortable for the radiologist to read the image, as this operation reduces the contrast between the collimated area and the image itself.

In an alternative embodiment, the deep neural network is trained on the identification of more complex area's of interest, such as for instance the identification of bone structures in extremities or other body parts, the identification of the lungs in a chest, or for instance on the identification of malignant structures (tumors, lung nodules, . . . ). It speaks for itself that the deep neural network will have to be trained in this case with the appropriate image data set, and that it is of essence that the targeted region of interest can be represented easily both as an area and as a contour.

Figure 2:
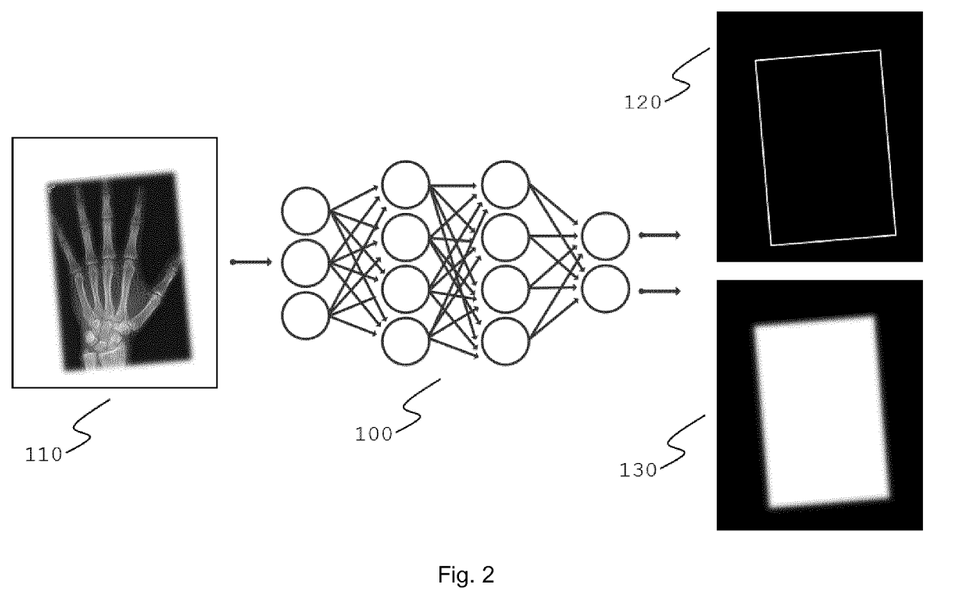
FIG. 2 gives a schematic overview of the central position of the trained deep neural network [100] in a preferred embodiment of the invention, wherein a medical image [110] is presented as input to the deep neural network, which produces two types of output: the confidence level contour map [120], and a confidence level region map [130]. The preferred embodiment relates to a segmentation method for identifying a collimation area in a radiography image.

After the training step of the deep neural network as explained above, a next step in the method of the invention is that a new medical image [110], for which the segmentation target has to be identified and located, is presented to the deep neural network in order to calculate the two outputs [120, 130] and where one of the outputs is the segmentation target that is represented as a detected confidence level contour map [120].

Figure 3:
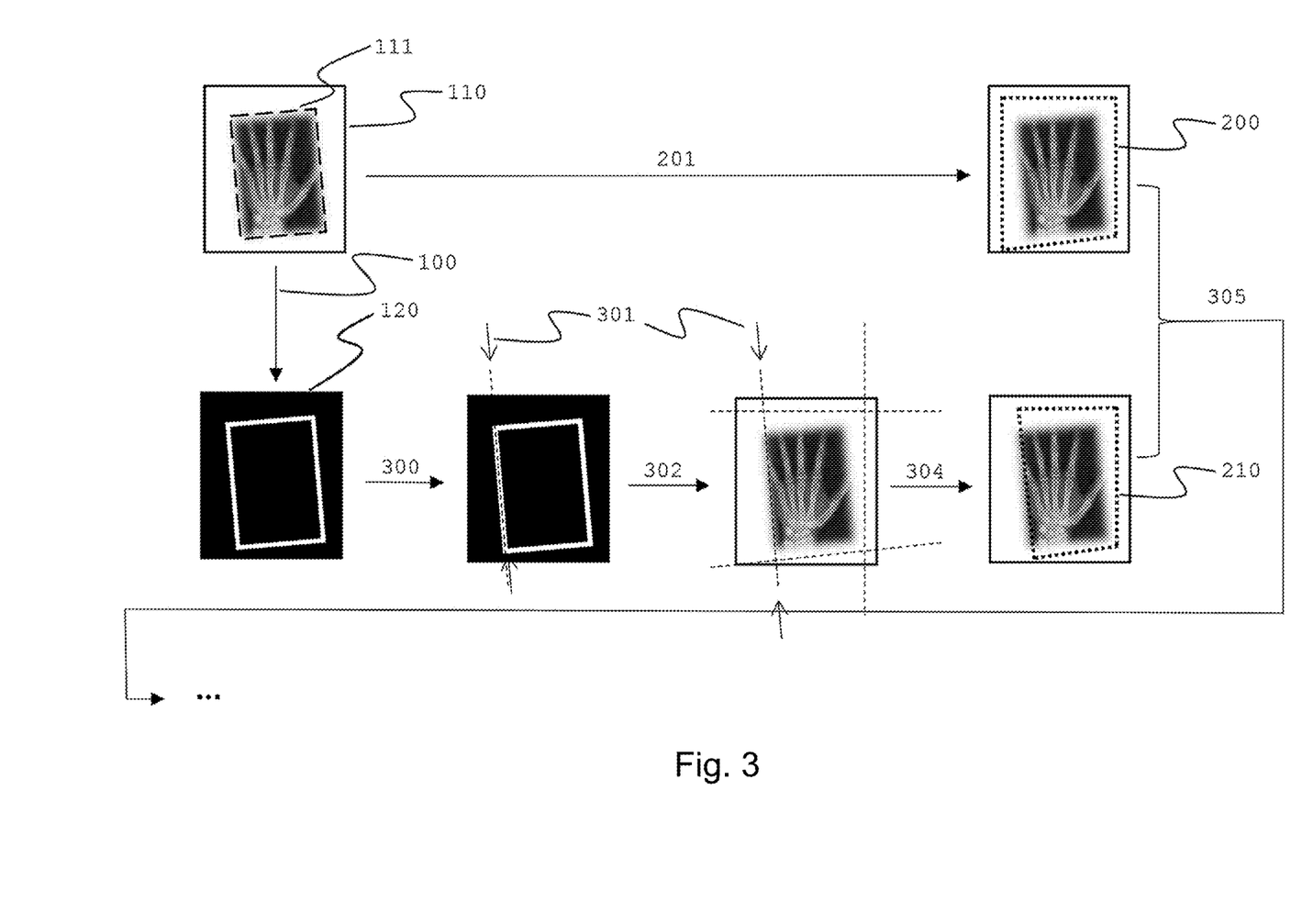
FIG. 3 is a flowchart of a preferred embodiment of the invention that is used for segmenting a collimation area in a radiography image. [110] represents the original radiography image from which the collimation area [111] needs to be segmented. The radiography image [110] is presented to the deep neural network [100], which produces a confidence level contour map [120]. From the original radiography image [110], a safe initial contour [200] is estimated [201], which will be used as a starting point to compare and validate [305] the found improved proposal contour [210] against. The confidence level contour map [120] is subsequently and iteratively decomposed [300] (using a e.g. a RANSAC algorithm) into discrete contour elements [301].
Figure 4:
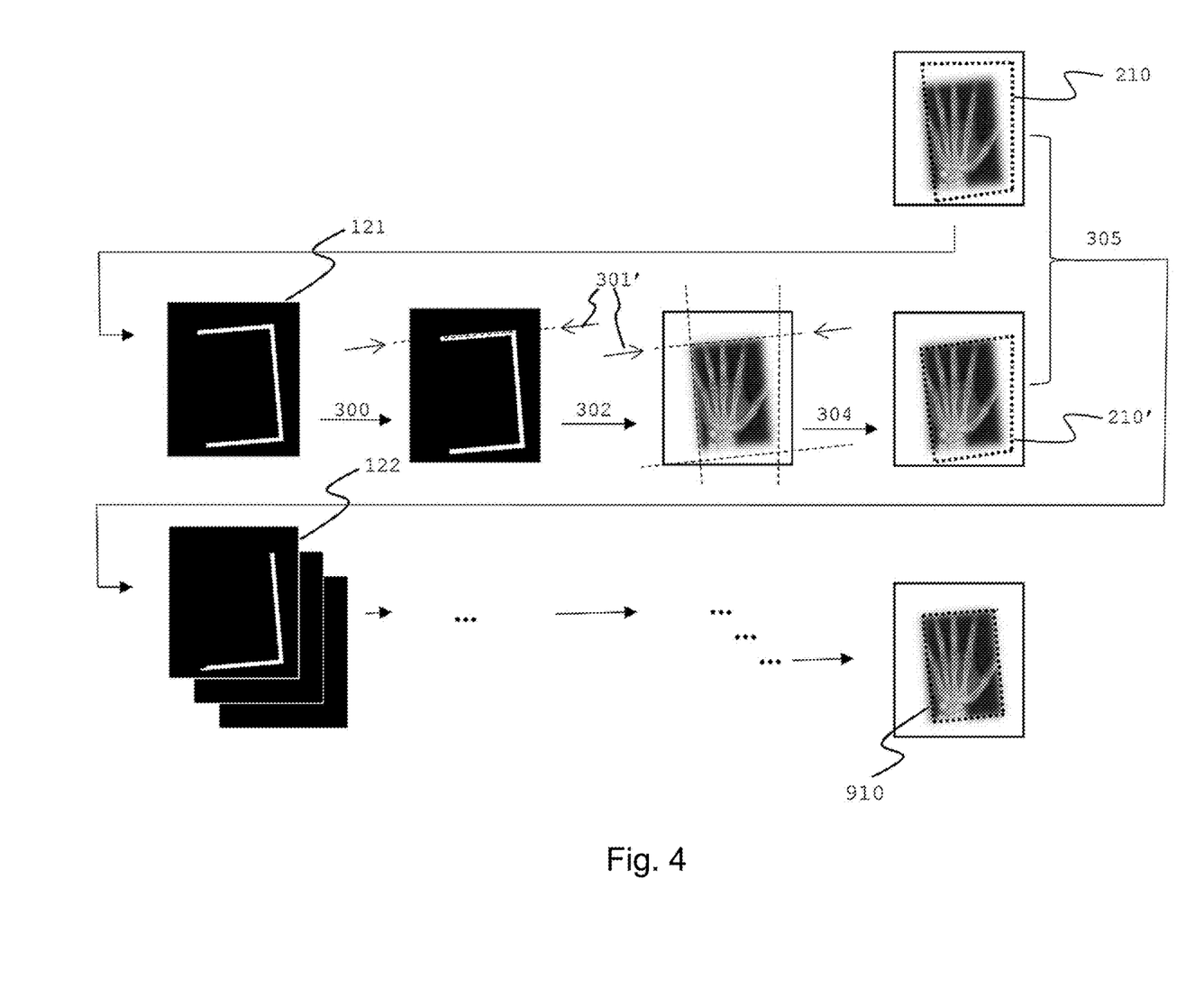

In a subsequent decomposition step [300], the detected confidence level contour map [120] will be decomposed into a discrete number of contour elements [301, 301'] that can be expressed in a (mathematically) analytical way, and which—when summed up—represent a completely closed contour of the targeted region of interest. In the case of the presence of multiple regions of interest in the medical image, the targeted region of interest may be expressed as a set of closed contours. In order to be able to describe such a proposal contour analytically, it may be decomposed into multiple contour elements, which are to be considered as a number of lines, curves or other shaped lines that may be described in an analytical way, and that together, when summed up, describe the entire proposal contour. The result of the sum of the found contour elements is a closed piecewise continuous function. It is important that the recomposed result is a closed contour, as this is a domain requirement for any segmentation problem. The decomposition step may be any type of algorithm that is capable of extracting certain contour features such as lines, arcs and corners. Such a contour element may, in the simplest form, be a line segment that can be expressed easily in a mathematical and analytical way.

In a preferred embodiment, the decomposition algorithm is a RANSAC (Random Sample Consensus) estimation, that is an iterative method to estimate parameters of a mathematical model from a set of observed data that contains outliers (data points that are far away from the other points), and thus is less sensitive to noise. Alternative methods can be Hough transform, or Line Segment Detector algorithms.

The extracted contour elements from the decomposition step above are subsequently validated before they are accepted as a contributing contour element of the final segmentation result. In the context of this invention, this validation will be made against information in the output of the deep learning network which is not being used in the previous step for extracting the contour elements, and which is represented as an area (a detected confidence level region map). The validations thus take place at the level of the contour element, not yet at the recomposed contour.

In one embodiment of the invention, the validation of a certain contour element [301] is done by comparing a cost function [305] of a contour that is derived in a first instance from a so-called safe initial contour [200], with the same cost function when applied on a new contour proposal [210] in which the proposed contour element contributes. The new contour proposal [210] should have a lower cost function result in comparison with the previously proposed contour (which is the safe initial contour at the start of the iterative process) before the proposed contour element can be accepted as a valid contribution to the final solution. As a safe initial contour, a suitable contour should be chosen that falls within the boundaries of the medical image. Said safe initial contour should be chosen in a conservative fashion such that any risk to reduce this safe initial contour too much that it would exclude a part of the final solution is avoided. The most "conservative" safe initial contour that may be identified is the medical image boundary itself; if choosing this boundary as a first safe initial contour, then by definition there is no risk to exclude any data at all. Performance of the algorithm may however be improved in case that the safe initial contour already is chosen to better approach the final result.

The initial contour may be estimated based on algorithms that are known in the art and that are capable of providing a relatively good initial estimate without risking to excluding any part of the segmentation target. Alternatively, it is also possible to estimate the initial contour based information about the applied positions of the collimator blades during the exposure by the X-ray modality.

The above mentioned cost function is based on a measure of agreement d of the tested contour with the detected confidence level region map and/or the detected confidence level contour map. This may be achieved for instance by calculating a weighted sum of how close the tested contour is to the detected confidence level contour map, and the Srensen-Dice coefficient index of the inner part of the detected confidence level region map. The outcome of the cost function decreases for better candidates.

Additionally, other validation steps may be applied on the contour elements that depend on domain specific knowledge of the medical image. Validation steps (or acceptance criteria) relating to domain specific knowledge may accept or decline a certain proposed contour element as a valid solution in the case that certain criteria are met, or—respectively—not met. As an example that relates to the segmentation of a collimation area in a radiographic image, a possible validation criterion could be the fact that a typical collimation field has a quadrangular shape in case that it is entirely visible in the field of view, and that by consequence the contour elements are straight lines. Results that are not represented by straight lines may therefore be rejected. Also, contour elements that cut through a part of the detected confidence level region map may similarly be rejected.

In case that any of the validation steps fail on a proposed contour element during the decomposition step, and the contour element is consequently rejected, this contour element is replaced with the original corresponding contour element that was replaced by the newly proposed contour element in the previously proposed contour (which is the safe initial contour at the start of the iterative process). After a validation of a contour element, the data of the confidence level contour map [120] contributing to the decomposition algorithm (e.g. the RANSAC estimation) of said contour element is removed from the confidence level contour map [120, respectively 121], eventually only partially removed since for some parts might contribute to other contour elements, resulting in a next (more data-limited) confidence level contour map [121, respectively 122] comprising less data than the upstream confidence level contour map. This allows the next step of the iteration to proceed with identifying the next contour element, until there is no further data present in the last confidence level contour map.

After a discrete number of iterations wherein contour elements are successfully identified, and validated or rejected, no further data will be available in the (more limited) confidence level contour map [122] which is the starting point of each next iteration step. At this point, all newly validated contour elements and all original corresponding contour elements that were not replaced by the newly proposed contour element due to their rejection, may be added up with each other to form a recomposed contour or the final contour result [910].

Even so, optional validation steps may be applied also on the level of the recomposed contour or the final contour result [910]. Such validation steps will also depend on certain characteristics for the segmentation result that is available as domain knowledge. For instance, bone segmentation should lead to a result wherein segmented area or areas clearly contain high electron density material, i.e. that the segmented area(s) are clearly coloured white in the radiograph. Or alternatively, for instance, domain specific knowledge could exclude certain proposed contours that have deviating shapes from the expected one or for instance seem to include multiple isolated areas, whereas this is not allowed.

As an example, the decomposition step for targeting a collimation area in a medical image will substantially differ from a decomposition step for targeting for instance lung tissue in a medical image. The domain knowledge about segmenting a collimation area may for instance allow assumptions with regards to the shape of the collimation area (which is mostly rectangular, unless only partially visible in the field of view of the image), and also allows to make the consideration that a false negative result (collimation are is estimated too large) is less critical than a false positive result (where the collimation area would be estimated too small). Domain knowledge of the application will thus allow to implement intelligent decomposition decisions when determining the contour elements.

As an alternative embodiment, a similar approach may be conceived to start a decomposition step starting from the confidence level region map [130]. Based on the confidence level region map a region mask can be created (for example with a thresholding method). A further improvement of this mask can be created based on a so-called connected component analysis of the region mask and based on the neighbouring contour information each component has in the confidence level contour map. Components who are not connected to a minimal amount of contour map could be discarded, close components can be merged. Domain specific knowledge can be used to further improve the region mask. Such domain knowledge may be for instance a maximum number of components possible in one image or a definition of a minimum size component.

The invention claimed is:

1. A method for improving the performance of a deep neural network on performing a segmentation task of identifying a region of interest in an input image which is a medical image, comprising:
performing two training tasks on said deep neural network for the identification of said region of interest on two different representations of said region of interest, said representations being a definition of a region and a contour of said region of interest,
obtaining a detected confidence level region map, representing a pixel wise probability of the presence of a part of the segmentation target in the medical image in the form of an image matrix, and a detected confidence level contour map, representing a pixelwise probability of the presence of a part of a contour in the same medical image in the form of an image matrix, for an input image from said trained deep learning network,
from said detected confidence level contour map, iteratively determining a set of discrete contour elements to describe said detected confidence level contour map as a closed contour, by optimizing the sum of said continuous functions describing said discrete contour elements as a best fit to said detected confidence level contour map,
performing a validation of each of said sum of said discrete contour elements by evaluating a measure d of agreement of an improved proposal contour with said detected confidence level region map of said region of interest, said improved proposal contour comprising said contour element, and
returning a final contour result comprising said validated contour elements as a result for the identified region of interest.

2. The method according to claim 1, wherein said two training steps comprise:
performing a training step of said deep neural network on identifying said region of interest, comprising:
presenting a training data set of medical images containing said region of interest to said deep neural network as an input, said training data set comprising for each image an associated ground truth binary region map representing the location of said region of interest in said image, and
performing a training step of said deep neural network on identifying said contour of interest, comprising:
presenting a training data set of medical images containing said region of interest to said deep neural network as an input, said training data set comprising for each image an associated ground truth binary contour map representing the location of a contour of said region of interest in said image.

3. The method according to claim 1, wherein the medical images are CR, DR or other radiography images.

4. The method according to claim 1, wherein the medical images are radiography images, and wherein said region of interest is the skeleton, the lungs, or bone structures.

5. The method according to claim 1, wherein the best fit is based on a RANSAC estimation or Hough transform.

6. The method according to claim 1, wherein said contour elements are lines, curves, or other continuous functions.

7. The method according to claim 1, wherein said evaluation of said contour elements is performed by calculating a measure d' of agreement of said improved proposal contour, said improved proposal contour comprising said contour element, with the detected confidence level region map, and comparing it with a measure d of agreement calculated for a previous proposal contour, said previous proposal contour not comprising said contour element, with the detected confidence level region map, and accepting said contour element as a contour element of an improved proposal contour when d'>d.

8. The method according to claim 1, wherein each of said contour elements is additionally validated against at least one rule that is defined by any criterion that may allow a contour element to be accepted/declined based on domain knowledge.

9. The method according to claim 1, wherein said final contour result is validated against at least one rule that is defined by any criterion that may allow a contour element to be accepted/declined based on domain knowledge.

10. A data processing system comprising means for carrying out the steps of the method of claim 1.

11. A computer program comprising instructions which, when the program is executed by a computer, cause the computer to carry out the steps of the method of claim 1.

12. The method according to claim 2, wherein the medical images are CR, DR or other radiography images.

13. The method according to claim 2, wherein the medical images are radiography images, and wherein said region of interest is the skeleton, the lungs, or bone structures.

14. The method according to claim 2, wherein the best fit is based on a RANSAC estimation or Hough transform.

15. The method according to claim 2, wherein said contour elements are lines, curves, or other continuous functions.

16. The method according to claim 2, wherein said evaluation of said contour elements is performed by calculating a measure d' of agreement of said improved proposal contour, said improved proposal contour comprising said contour element, with the detected confidence level region map, and comparing it with a measure d of agreement calculated for a previous proposal contour, said previous proposal contour not comprising said contour element, with the detected confidence level region map, and accepting said contour element as a contour element of an improved proposal contour when d'>d.

17. The method according to claim 2, wherein each of said contour elements is additionally validated against at least one rule that is defined by any criterion that may allow a contour element to be accepted/declined based on domain knowledge.

18. The method according to claim 2, wherein said final contour result is validated against at least one rule that is defined by any criterion that may allow a contour element to be accepted/declined based on domain knowledge.

19. A system for performing a segmentation task of identifying a region of interest in an input image which is a medical image, the system comprising:
   a processor; and
   a memory storing processor-executable instructions that, when executed by the processor, operate a deep neural network configured for:
   performing two training tasks on said deep neural network for the identification of said region of interest on two different representations of said region of interest, said representations being a definition of a region and a contour of said region of interest;
   obtaining a detected confidence level region map, representing a pixel wise probability of the presence of a part of the segmentation target in the medical image in the form of an image matrix, and a detected confidence level contour map, representing a pixelwise probability of the presence of a part of a contour in the same medical image in the form of an image matrix, for an input image from said trained deep learning network;
   from said detected confidence level contour map, iteratively determining a set of discrete contour elements to describe said detected confidence level contour map as a closed contour, by optimizing the sum of said continuous functions describing said discrete contour elements as a best fit to said detected confidence level contour map;
   performing a validation of each of said sum of said discrete contour elements by evaluating a measure d of agreement of an improved proposal contour with said detected confidence level region map of said region of interest, said improved proposal contour comprising said contour element; and
   returning a final contour result comprising said validated contour elements as a result for the identified region of interest.

20. A non-transitory computer-readable media for performing a segmentation task of identifying a region of interest in an input image which is a medical image, the non-transitory computer-readable media storing processor-executable instructions that, when executed by a processor, operate a deep neural network configured for:
   performing two training tasks on said deep neural network for the identification of said region of interest on two different representations of said region of interest, said representations being a definition of a region and a contour of said region of interest;
   obtaining a detected confidence level region map, representing a pixel wise probability of the presence of a part of the segmentation target in the medical image in the form of an image matrix, and a detected confidence level contour map, representing a pixelwise probability of the presence of a part of a contour in the same medical image in the form of an image matrix, for an input image from said trained deep learning network;
   from said detected confidence level contour map, iteratively determining a set of discrete contour elements to describe said detected confidence level contour map as a closed contour, by optimizing the sum of said continuous functions describing said discrete contour elements as a best fit to said detected confidence level contour map;
   performing a validation of each of said sum of said discrete contour elements by evaluating a measure d of agreement of an improved proposal contour with said detected confidence level region map of said region of interest, said improved proposal contour comprising said contour element; and
   returning a final contour result comprising said validated contour elements as a result for the identified region of interest.

* * * * *